J. A. HAFNER.

DEVICES FOR PREVENTING BACKLASH IN MACHINERY.

No. 7,359. Reissued Oct. 24, 1876.

WITNESSES

H. Aubrey Coulmire

C. R. Ewerh.

INVENTOR

John A. Hafner

Alexander Mason

ATTORNEYS

N. PETERS, PHOTO-LITHOGRAPHER, WASHINGTON, D. C.

UNITED STATES PATENT OFFICE.

JOHN A. HAFNER, OF PHILADELPHIA, PENNSYLVANIA.

IMPROVEMENT IN DEVICES FOR PREVENTING BACKLASH IN MACHINERY.

Specification forming part of Letters Patent No. 168,481, dated October 5, 1875; reissue No. 7,359, dated October 24, 1876; application filed October 11, 1876.

*To all whom it may concern:*

Be it known that I, JOHN A. HAFNER, of Philadelphia, in the county of Philadelphia and State of Pennsylvania, have invented certain new and useful Improvements in Device for Preventing Backlash of Machinery; and I do hereby declare that the following is a full, clear, and exact description thereof, references being had to the accompanying drawings, and to the letters of reference marked thereon, which form a part of this specification.

My invention relates to an improvement upon Letters Patent No. 86,533, granted to me February 2, 1869; and it consists in forming the coils of the spring, as therein patented to me, of varying thicknesses, increasing in size from the inner to the outer one, for the purpose of equalizing the strain on the spring; and in enlarging the bottom part of hub, to which this spring is connected, so that the greatest strength is had upon that part where the greatest strain is caused, all as more fully hereinafter set forth.

In order to enable others skilled in the art to which my invention appertains to make and use the same, I will now proceed to describe its construction and operation, referring to the annexed drawing, in which—

Figure 1:
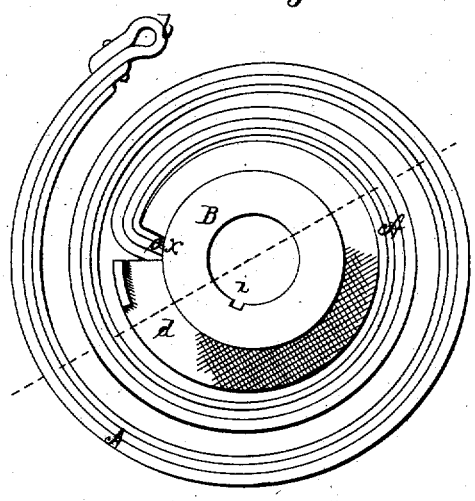
Figure 2:
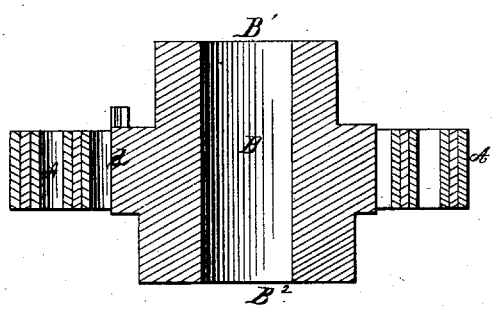

Figure 1 is a plan view of my invention, and Fig. 2 is a section of the same.

My coil-spring is made of two or more plates, A A, riveted together at their inner ends and bent to form a hook, *a*. It is well known in the construction of flat coil-springs that, the plates being of the same thickness, a spring of small coils will be of greater stiffness than one of larger coils, and hence, when a spring is made of two or more plates of the same thickness, the strain upon the various plates is unequal, and the spring will not have the strength it ought to possess. To obviate this difficulty, I make the plates A A of varying thickness—that is, each plate is made thicker than the one immediately within it, and such increased thickness should be in proportion to the increase in the size of its coils, so that all the plates in the spring will be of equal stiffness.

The outer plate of the spring is formed at its outer end with a loop, *b*, to be fastened to part of the machinery to which it is to be applied. The hook *a* of the spring is inserted in a notch, *x*, made in an eccentric flange, *d*, which is formed around the exterior of the hub B at or near the center thereof. This hub is made with an interior longitudinal groove or key-seat, *i*, for the key to enter in fastening the hub to the shaft on which it is to be applied. The part $B^1$ of the hub above the flange *d* is made of reduced thickness, while the part $B^2$, below said flange, is made of increased thickness, giving it the requisite strength just where needed in driving the key, while there is no superfluous metal at the other end, making the hub as light as possible. The spring and hub may be used on any classes of machinery where applicable. In some cases I may shrink a wrought-iron band around one end of the hub to make the same larger and of greater strength.

It will be understood that in my patented device, hereinbefore referred to, the plates of the spring were of the same thickness, while in the present case they vary in thickness from the inner to the outer one, and that the hub was of the same size on each side of the central circular flange.

The improvement hereinbefore described is of such a nature in practice that the defects found in my former device are remedied.

I am aware that it is not new in carriage-springs to form the leaves of decreasing thickness and width; hence I do not claim such, broadly, as my invention, simply as applied to the coil-spring patented February 2, 1869.

Having thus fully described my invention, what I claim as new, and desire to secure by Letters Patent, is—

1. The spring A, composed of two or more plates or leaves when made of varying thickness from the inner to the outer one, and having the loop *b* and hook *a*, as and for the purposes herein set forth.

2. The hub B, having central flange *d* and a notch for the hook *a* of the spring A, when said hub is constructed larger on one side of said flange than on the other, as and for the purposes herein set forth.

In testimony that I claim the foregoing I have hereunto set my hand this 27th day of September, 1876.

JOHN A. HAFNER.

Witnesses:

EDWIN F. GLENN,
THEODORE JORDAN.